M. PIOTROWSKI.
ALCOHOL BURNER.
APPLICATION FILED MAR. 20, 1918.
1,272,995.
Patented July 16, 1918.
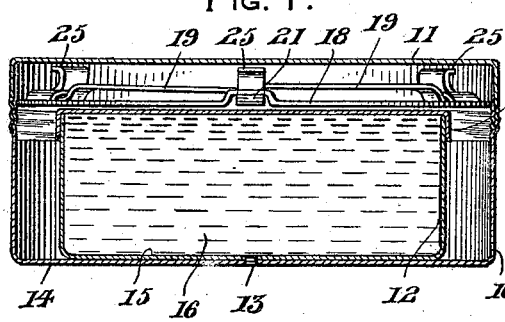
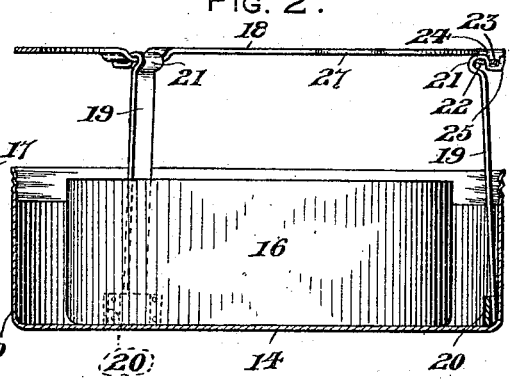
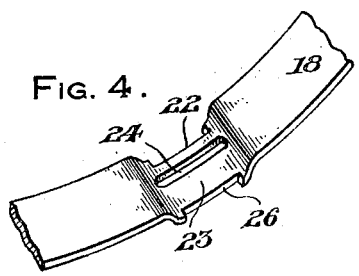
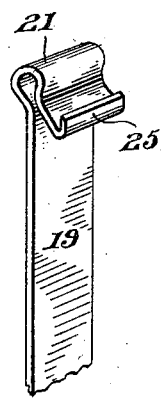
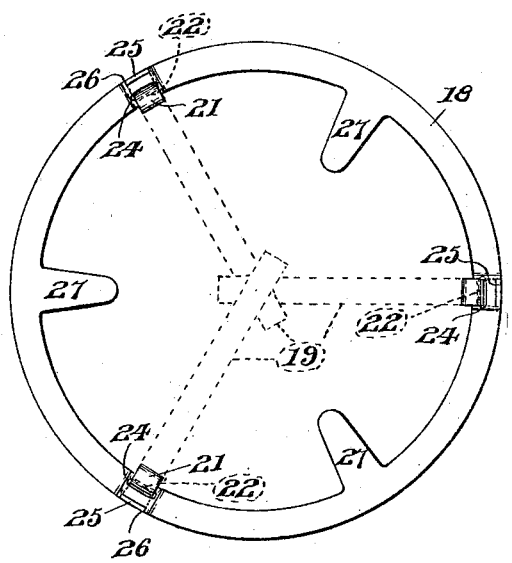
Inventor
M. Piotrowski
By A. M. Wilson
Attorney

UNITED STATES PATENT OFFICE.

MIKOLAJ PIOTROWSKI, OF ELMIRA HEIGHTS, NEW YORK.

ALCOHOL-BURNER.

1,272,995.   Specification of Letters Patent.   Patented July 16, 1918.

Application filed March 20, 1918. Serial No. 223,504.

*To all whom it may concern:*

Be it known that I, MIKOLAJ PIOTROWSKI, a subject of the Emperor of Austria, residing at Elmira Heights, in the county of Chemung and State of New York, have invented certain new and useful Improvements in Alcohol-Burners, of which the following is a specification.

The primary object of the invention is to provide a simple and inexpensive burner structure whereby canned fuel may be readily employed for cooking or warming purposes.

A further object of the invention is the provision of a device that is easy and inexpensive to manufacture to be employed for cooking and heating purposes, the same being compactly arranged when not in use ready to be set up for instant use when desired.

In the drawing forming part of this application and in which like designating characters refer to corresponding parts throughout the several views, Figure 1 is a central radial sectional view of the device in its folded arrangement.

Fig. 2 is a similar view thereof when set up for use.

Fig. 3 is a top plan view of the supporting grid, the legs being illustrated by dotted lines in their folded positions.

Fig. 4 is a perspective view of a hinging portion of the grid, and

Fig. 5 is a perspective view of the hinged portion of one of the legs detached from the grid.

Referring more in detail to the drawing, a can-shaped outer casing 10 is provided having a removable covering 11 externally screw-threaded thereon while a container 12 is concentrically positioned within the said casing, preferably secured in place by means of a central rivet 13 extending through the bottoms 14 and 15 of the said casing and container respectively. The container 12 is adapted for holding what is commonly termed canned fuel such as 16 of any well known form, such for instance as a composition of soap and alcohol, a removable cover 17 being provided for the top of the container 12 and spaced from the lid 11 of the casing 10 when the device is closed.

A circular grid 18 is provided for use with the device for suitably supporting any article for heating above the container 12 when the device is in use, the said grid 18 having a plurality of legs 19 connected to the grid and adapted for substantially vertical positioning beneath the grid 18 when set up for use, with the lower ends of said legs seated within sockets 20 provided therefor in the casing 10. The legs 19 are preferably formed of strip metal having an opposite loop 21 at the top thereof for pivoting upon a pintle 22 formed in a depressed portion 23 of the grid 18 by providing a longitudinal slot 24 in the said depressed portion. An angular finger 25 projects from the loop 21 adapted for upward movement into seating position within a notch 26 at the outer edge of the depressed portion 23 of the grid as best illustrated in Fig. 2 of the drawing.

It will be seen that the legs 19 may be readily folded inwardly in overlapping relations beneath the grid 18 as shown in Figs. 1 and 3 of the drawing when the device is not in use, at which times the grid is inclosed between the cover 17 of the container and the lid 11 of the casing 10, presenting a compact position for convenience in carrying the device. The legs 19 are readily unfolded and swung outwardly to their substantially vertical arrangement perpendicular to the grid 18 when desired for use, with the fingers 25 seated within the outer notches 26 of the grid. The fingers 25 function as stop members limiting the outward hinging movements of the legs as well as affording stronger supporting connections between the grid and legs.

Inwardly projecting ears 27 are provided for the grid 18 for assisting in supporting articles which are placed upon the grid. When the grid 18 is open and mounted over the container 12 with the said cover and lid removed, the material 16 may be lighted for heating or cooking articles positioned upon the grid 18. The cover 17 may be, therefore, readily applied for closing the container 12 and the legs 19 of the grid 18 closed and the grid positioned upon the top of the casing 10 while the lid 11 may then be placed upon the said casing inclosing the grid therein. A serviceable and inexpensive heating device is thus provided, it being understood that any form of fuel desired may be provided in the container 12.

What I claim as new is:—

1. A grid for burners, comprising an annular member having side depressions, each depression being provided with a longitudinal slot and an outer side notch, a supporting leg having a loop hinged upon the portion of the grid lying inwardly of the adjacent one of said slots, the said leg having an integral stop finger projecting from the loop thereof supportingly arranged beneath the outer portion of the adjacent depression and seated within the outer notch thereof.

2. A grid comprising an annular metallic support having inwardly projecting ears, the said support having a depression provided with a longitudinal slot forming a pintle at the inner side of the support, the said depression further having a notch at its outer side, a supporting leg formed of strip metal looped in hinged arrangement over the said pintle and extending through said slot, an integral finger carried by the looped portion of the leg adapted for supportingly underlying the adjacent outer portion of said depressed portion and extending within the said notch when the grid is set up for use with the leg arranged substantially in perpendicular relations therewith.

In testimony whereof I affix my signature.

MIKOLAJ PIOTROWSKI.

Copies of this patent may be obtained for five cents each, by addressing the "Commissioner of Patents, Washington, D. C."